United States Patent [19]

Casarini et al.

[11] Patent Number: 5,194,496
[45] Date of Patent: Mar. 16, 1993

[54] COMPOSITIONS OF POLYPHENYLENE OXIDE OR MIXTURES OF POLYPHENYLENE OXIDE STABILIZED WITH COMPOUNDS CONTAINING A TRIPLE ACETYLENIC BOND

[75] Inventors: Andrea Casarini, Paullo; Giorgio D. Fortuna, Milan; Giovanni Zannotti, San Giuliano Milanese, all of Italy

[73] Assignee: ECP Enichem Polimeri S.r.l., Milan, Italy

[21] Appl. No.: 774,515

[22] Filed: Oct. 8, 1991

[30] Foreign Application Priority Data

Oct. 10, 1990 [IT]  Italy ................................ 21698 A/90

[51] Int. Cl.$^5$ ............................................. C08L 71/12
[52] U.S. Cl. ........................................ 525/68; 525/92; 525/397; 525/905
[58] Field of Search .................... 525/397, 905, 68, 92

[56] References Cited

U.S. PATENT DOCUMENTS 4,315,086  2/1982  Ueno et al. .......................... 525/396
4,831,115  5/1989  Golba, Jr. et al. ................... 525/390
4,888,397  12/1989  van der Meer et al. ............. 525/397

Primary Examiner—James J. Seidleck
Assistant Examiner—Thomas Hamilton, III
Attorney, Agent, or Firm—Oblon, Spivak, McClelland, Maier & Neustadt

[57] ABSTRACT

Polymeric compositions based on at least one polyphenylene ether, obtained from the (co)polymerization by oxidative coupling of one or more substituted phenols, either alone and/or together with at least one (co)polymer of styrene, are thermally stabilized by adding at least one compound having the structural formula $$R-C\equiv C-COOH \qquad (I)$$

where R has the meaning described in the text. These compositions are characterized by the fact that they have excellent thermal stability in the molten state, are long-lasting and have a much better fluidity and processability compared to the corresponding polymeric blends which do not contain (I).

13 Claims, No Drawings

COMPOSITIONS OF POLYPHENYLENE OXIDE OR MIXTURES OF POLYPHENYLENE OXIDE STABILIZED WITH COMPOUNDS CONTAINING A TRIPLE ACETYLENIC BOND

The present invention concerns polymeric compositions characterized by their improved fluidity in the molten state and thermal stability, obtained by mixing at least one compound having the structural formula $$R-C\equiv C-COOH \qquad (I)$$

where R is specified later, with polymeric blends and/or alloys of a polyphenylene oxide either alone or with at least one (co)polymer of styrene.

It is known that polyphenylene oxides, otherwise known as polyphenylene ethers (PPE), obtained from the (co)polymerization by oxidative coupling of one or more substituted phenols, cannot easily be used on their own because of their high viscosity values in the molten state, the consequently high operating temperatures and high degree of thermo-oxidative sensitivity causing colour changes (darkening), partial cross-linking and gelation of the polymer during the working process.

The beneficial combination of PPE with one or more styrenic resins considerably reduces the operating temperature and produces resins which can be more easily processed and with a reciprocal improvement in the intrinsic properties of the constituents. By varying the ratios between the polyphenylene oxide and the styrenic polymer and depending on the application requirements, shock resistant polyphenylene oxide can be obtained with improved processability, or polystyrenes and their copolymers with improved heat and flame resistance, better impact strength and technological properties.

It is also known however that not only PPE, but also its blends with styrenic homo and copolymers, in spite of the above improvements, undergo a change in the molecular structure at the high transformation temperatures of the manufactures.

With particular reference to polyphenylene oxide, thermal degradation processes occur, with a consequent decrease in the molecular dimensions and/or a contemporary combination of macromolecules can occur, caused by radicalic processes due to the oxygen in the air and triggered by the presence of catalytic residues. These combinations in the case of PPE obtained by the oxidative coupling of 2,6-dimethylphenol, are created by the methylic groups present in the polymeric chain as substituents of the benzenic ring in positions 2 and 6.

The overall effect of this change is a general decrease, even if limited, of the number average molecular weight of the polyphenyloxide and in some cases an increase in the weight average molecular weight, with a consequent variation in the molecular weight distribution. When the cross-linking action is particularly vigorous, various quantities of gel can be formed.

It is known to experts in the field that the effects of heat degradation can be considerably reduced with the help of suitable stabilizers belonging to different groups of compounds which have varying degrees of effectiveness, such as: alkylic and/or arylic phosphites, phenols whose characteristic function is protected by sustituent groups having notable sterical hindrance, thioethers of esters of aliphatic carbonylic acids, dithiocarbamates of heavy metals, 2-mercaptobenzyimidazole, 2-mercaptobenzotriazole, 2.4-bis(n-octyltlio)-6-(4-hydroxy-di-t-butyl-aniline)-1,3,5 triazine, hexamethylphosphoramide, etc.

Viceversa, the cross-linking reactions triggered by radicalic processes cannot be governed by the above additives and generally require the use of chemical compounds having particular structures.

These compounds, probably nullify the radicalic systems present in a latent state in the polyphenylene oxide, their effects becoming manifest when the material is heated to high transformation temperatures.

Transformation technology requires the polymeric material to have sufficient thermal stability as to ensure only slight variations in the molecular weight, guaranteeing an almost constant fluidity. This condition is necessary to obtain manufactures with satisfactory technological properties at a high hourly output.

Patent literature indicates several compounds which are effective additives for thermally stabilizing polyphenylene oxide and/or its blends with polystyrenic polymers, by keeping the fluidity of the material in its molten state at an adequate level.

These products, for example, are aliphatic and cycloaliphatic conjugated dienic compounds, dienophilic ethylenic compounds and their precursors.

European patent application No. 121.974 cites cyclopentadiene, N alkyl or aryl substituted maleic imide, acenaphthylene, indene, maleic anhydride, mixtures of maleic anhydride with primary amines.

The use of imides of maleic acid is claimed in European patent application No. 222.246, whereas European patent application No. 257.486 describes the us of alkylic esters and/or alkylaryls of maleic and fumaric acids as heat stabilizing agents.

The present invention is based on the extremely surprising experimental discovery that some compounds, not belonging to the above-mentioned groups, are able to give polyphenylene oxide and its blends with styrenic polymers a long-lasting thermal stability of the materials in their molten state, and at the same time, guaranteeing sufficient fluidity to allow improved processability.

The stabilizing additives, subject of the present invention, capable of giving polyphenylene oxide and its blends with (co)polymers of styrene an improved thermal stability are represented by the structure $$R-C\equiv C-COOH \qquad (I)$$

where R is an alkylic radical containing from 1 to 6 carbon atoms, an arylic radical, an alkylarylic radical, a cycloalkylic radical, containing from 5 to 7 carbon atoms in the ring, haloalkylic, haloarylic radical.

These stabilizing agents are effective at a concentration of 0.05–10 parts by weight for every 100 parts by weight of polyphenylene oxide or its blends with homo and copolymers of styrene. The best results are obtained with quantities of additive ranging from 0.05 to 4 parts by weight for every 100 parts by weight of polyphenylene oxide or its blends.

These stabilizing agents can be added to the polyphenylene oxide or its relative blends with (co)polymers of styrene, using any of the known techniques for this purpose.

In any case, the addition of the stabilizing system of the present invention causes a decrease in the reactions which produce an increase in the molecular dimensions of the polyphenylene oxide, thus obtaining a considerable improvement in the fluidity under the same operating and transformation conditions of the polyphenylene oxide and its blends.

Examples of chemical compounds having a structure corresponding to (II) are the following acids: 2-butynoic, 2-hexynoic, 2-heptynoic, 2-octynoic, 3-phenylpropynoic.

3-phenylpropynoic acid is particularly suitable for the purposes of the present invention.

Polyphenylene ethers (PPE) are compounds which have been known for a long time. They are described in numerous patents, and are generally obtained by means of oxidative coupling in the presence of a suitable catalyst of one or more alkylphenols, the most widely used being 2,6-dimethylphenol. They correspond to the general formula: (II)

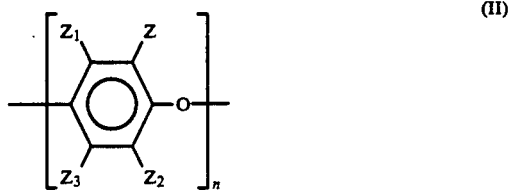

where $Z, Z_1, Z_2, Z_3$ are independently chosen from the group comprising hydrogen, chlorine, bromine, fluorine, alkyl, substituted alkyl, cycloalkyl, substituted cycloalkyl, phenyl, substituted phenyl and n represents the total number of monomeric units and is an integer higher than 50.

Non-restricting examples of PPE which can be used for the production of the polymeric compositions of the present invention and relative manufactures are:
Poly(2,6-dimethyl-1,4-phenylene ether);
poly(2,6-diethyl-1,4-phenylene ether);
poly(2,6-methyl-6-ethyl-1,4-phenylene ether);
poly(2-methyl-6-propyl-1,4-phenylene ether);
poly(2,6-dipropyl-1,4-phenylene ether);
poly(2,3,6-trimethyl-1,4-phenylene ether);
poly(2-chloro-1,4-phenylene ether);
poly(2-bromo-1,4-phenylene ether);
poly(2-phenyl-1,4-phenylene ether);
poly(2-chloro-6-bromo-1,4-phenylene ether);
poly(2,6-dichloro-1,4-phenylene ether).

It is particularly preferable to use poly(2,6-dimethyl-1,4-phenylene ether) for which, in structure (II) $Z_1=Z_3=H; Z=Z_2=CH_3$.

The preferred poly(2,6-dimethyl-1,4-phenylene ether) has a weight average molecular weight $\overline{MW}$ of between 8,000 and 80,000 g/moles and more precisely in the range of 15,000-60,000 g/moles, and an intrinsic viscosity, measured in chloroform at 25° C., of between 0.3 and 0.7 dl/g.

Equally suited for the purposes of the present invention are PPEs obtained by the oxidative coupling of 2 or more different phenols. Preferably, in these copolymers, one of the two or more monomeric components is 2,6-dimethylphenol and the comonomer is 2,3,6-trimethylphenol.

As is widely known, the oxidative condensation of 2,6 xylenol is catalysed by complexes of cupric salts with aliphatic amines; the present invention does not depend on the catalytic system used.

The methods of synthesis of the polyphenylene ethers used in the present invention are well known to experts in the field.

The (co)polymers of styrene (or styrenic resins) used for the purposes of the present invention, are all polymers, copolymers, interpolymers, random or block, linear or branched or graft, containing styrenic units.

Examples of these resins are polystyrene (PS), high impact polystyrene (HIPS), polystyrene grafted on any polymeric, plastic or thermoplastic substrate, ABS resins, SBR rubbers, linear or star copolymers based on polystyrene or grafted with polystyrene, various copolymers or interpolymers of styrene with different monomers, among which the copolymer styrene-maleic anhydride (sty-maleic) and styrene-maleic imide, styrene-acrylic acids, styrene-(meth)-acrylates, acrylonitrile-styrene-acrylates, methacrylate-acrylonitrile-butadiene-styrene etc.

The preparation of the above styrenic resins is also well known to experts in the field.

The polymeric compositions according to the present invention, contain from 1 to 99, preferably from 20 to 80 parts by eight of polyphenylene oxide, for every 100 parts by weight of the composition itself and from 0.95 to 99% by weight of styrenic resins. It is in fact possible, depending on the required uses of the polymeric blend, to obtain compositions with high mechanical properties (using low percentages of polystyrene), thus obtaining a modified polyphenylene oxide, or to prepare compositions which ar rich in polystyrene having better processability but lower mechanical properties.

Compositions, according to the present invention, containing from 0.95 to 80% by weight of styrenic resin are preferred.

Polymeric blends having an overall mixture of favourable characteristics such as high mechanical properties, good processability, thermal stability and reasonable flame-resistant performance, contain approximately equal parts by weight of polyphenylene oxide and styrenic resin. This is advantageous also from the economical point of view.

The excellent balance of properties of the above polymeric compositions makes it possible for them to be used in a wide range of areas including applications in the medical and biological field (sterilization), components for electrical and electronic equipment (electrical properties), and cars (limited water absorption and shock-resistant properties) and in the general replacement of metallic parts (low water absorption, dimensional stability etc).

The compositions, subject of the present invention, may contain either all or only some of the auxiliary agents used in the art, such as: eplasticizers, primary and secondary antioxidants, detaching agents, sliding agents, flame retardants, antistatic agents, dyes, pigments, reinforcing mineral charges such as glass fibres, microspheres etc.

The polyphenylene oxide used in the following examples is obtained by the oxidative condensation of 2,6 xylenol using a process claimed by the Applicant (Italian patent application No. 24024/83). The samples of homopolymer and its blends are characterized by measurements of:

Intrinsic viscosity ($\eta$) This property is determined in a chloroform solution at 25° C. using a Ubbelohde viscometer and is expressed in dl/g.

Melt Flow Index (MFI) The estimation of the flow index is carried out in a melt indexer with a load of 5 Kg and a temperature range of 280°–300° C. according to ASTM D 1238.

Weight average molecular weight ($\overline{MW}$) This measurement is carried out by means of the gel permeation chromatography of polymer solutions in tetrahydrofuran (conc. 0.1%), temperature 25° C. In the case of polyphenyloxide/polystyrene blends a U.V. detector at 280 nm specifically for polyphenylene oxide is used.

The polymeric compositions referred to in the following examples are prepared with polystyrene (Edistir 1380) having a flow index of 2.5 g/10', measured at 200° C. with a load of 5 Kg, and with shock-resistant polystyrene (Edistir SRL 640) having a flow index of 2.9 g/10', determined under the above conditions.

These blends are prepared by extruding the components fed in the pre-established ratios through a single-screw extruder with a screw diameter of 20 mm and a L/D=20. The temperature is 280° C., screw speed 50 revs/min. The experimental examples which follow provide a clearer illustration of the present invention but do not restrict it in any way.

EXAMPLE 1

50 parts of polyphenylene oxide ( $(\eta)=0.54$ dl/g; $\overline{MW}=43.800$ g/moles); 50 parts of polystyrene and 1 part of phenylpropiolic acid are mixed in a Brabender W50/E mixer at a temperature of 295 C., in closed chamber and a rotation speed of 100 revs/min.

After 25 minutes of treatment, the material is discharged and analysed. As a comparison, another mixture of the same ingredients is treated in the same way but without phenylpropiolic acid. The results given in Table 1, show that the presence of the additive considerably reduces the increase in the weight average molecular weight $\overline{MW}$ caused by the thermal treatment, allowing a good fluidity of the molten polymeric mass to be maintained.

TABLE 1

|  | MFI at 280° C.-5 Kg | $\overline{MW}$ of the polyphenylene oxide g/moles | % gel in THF |
|---|---|---|---|
| with additive | 6.7 g/10 min | 66,100 | 1.3 |
| without additive | 4.0 g/10 min | 99,600 | 6.0 |

EXAMPLE 2

50 parts of polyphenylene oxide indicated in the previous example, 50 parts of polystyrene, 1 part of phenylpropiolic acid, 0.2 parts of sterically hindered phenol and 0.4 parts of an ester of phosphorous acid are mixed at a temperature of 280° C. in a single-screw extruder with a screw speed of 50 revs/min. The extruded material is cooled with water and cut into granules.

The operation is repeated several times consecutively to estimate the thermal stability of the material as a function of the number of treatments, or, indirectly, of time.

The samples of material are characterized. The results given in Table 2 show that the addition of phenylpropiolic acid makes the material more fluid and inhibit the radical processes which cause, probably by the cross-linking of the macromolecules, an increase in the weight average molecular weight. For comparative purposes, the operation is repeated without the said acid.

TABLE 2

| NR of treatments in extruder | MFI 280° C.-5 Kg g/10 min | | $\overline{MW}$ of the polyphenylene oxide g/moles | |
|---|---|---|---|---|
| | Sample | Comparison | Sample | Comparison |
| 1 | 6.7 | 4.4 | — | — |
| 3 | — | 2.6 | — | — |
| 5 | 8.3 | 2.7 | 56,100 | 64,900 |

EXAMPLE 3

The experiment described in the previous example is repeated without sterically hindered phenol and ester of phosphorous acid.

The results given in Table 3 show the effectiveness of phenylpropiolic acid as a thermal stabilizer even without the above additives, fully described in the known technique.

TABLE 3

| NR of treatments in extruder | MFI 280° C.-5 Kg g/10 min | | $\overline{MW}$ of the polyphenylene oxide g/moles | |
|---|---|---|---|---|
| | Sample | Comparison | Sample | Comparison |
| 1 | 5.5 | 3.4 | — | — |
| 3 | 6.3 | — | — | — |
| 5 | 6.3 | 2.8 | 53,400 | 73,000 |

EXAMPLE 4

45 parts of polyphenylene oxide described in Example 1, 55 parts of Edistir SRL 640, 0.2 parts of sterically hindered phenol, 0.4 parts of an ester of phosphorous acid and 1.5 parts of phenylpropiolic acid are mixed in a single-screw extruder at a temperature of 280° C. with a screw speed of 50 revs/min. The material is cut into granules when it leaves the extruder and the granules are then dried. The thermal stability of the blend is estimated by measuring the flow index at 300° C. with a load of 5 Kg after leaving the material in the above conditions for different permanence times.

The effectiveness of phenylpropiolic acid as a thermal stabilizer of the blend is clearly shown from the results given in Table 4.

TABLE 4

| | MFI at 300° C. - 5 Kg g/10 min | | | |
|---|---|---|---|---|
| | Permanence time minutes | | | |
| | 0 | 10 | 20 | 30 |
| Sample | 17.5 | 18.3 | 19.2 | 18.9 |
| Comparison without additive | 7.9 | 8.7 | 9.5 | 10.4 |

EXAMPLE 5

The experiment described in the previous example is repeated, adding 1.5 parts by weight of carbon black to the mixture. The results given in Table 5 show that the presence of the pigment does not change the effectiveness of the unsaturated thermal stabilizer.

TABLE 5

| | MFI at 300° C. - 5 Kg g/10 min | | | |
|---|---|---|---|---|
| | Permanence time minutes | | | |
| | 0 | 10 | 20 | 30 |
| Sample | 15.3 | 15.9 | 15.8 | 15.3 |
| Comparison without additive | 6.1 | 6.25 | 6.7 | 7.3 |

EXAMPLE 6

45 parts of polyphenyene oxide ( $(\eta)=0.56$), 55 parts of Edistir SRL 640, 1.5 parts of an ester of phosphorus acid, 1.5 parts of carbon black and 1.5 parts of phenylpropiolic acid are treated as described in Example 2. The characterization of the material obtained in the subsequent extrusions is also carried out with the measurement of viscosity in the molten state but only in the case of the sample obtained after the first extrusion.

The results given in Tables 6 and 7 provide a further demonstration of the effect of phenylpropiolic acid

TABLE 6

| | MFI at 280° C. - 5 Kg g/10 min | |
|---|---|---|
| Number of extrusions | Sample | Comparison |
| 1 | 4.9 | 2.9 |
| 3 | 5.0 | 2.9 |
| 5 | 5.2 | 3.4 |
| 7 | 5.4 | 3.7 |

TABLE 7

| | Viscosity of the molten material at 280° C.; Pa sec | |
|---|---|---|
| Flow rate sec$^{-1}$ | Sample | Comparison |
| 48 | 965 | 1484 |
| 96 | 779 | 1187 |
| 192 | 631 | 872 |
| 480 | 408 | 497 |
| 960 | 267 | 323 |
| 1920 | 176 | 202 |

We claim:

1. Polymeric compositions based on at least one polyphenylene ether (PPE) obtained from the (co)polymerization by oxidative coupling of one or more substituted phenols, either alone or blended with at least one (co)polymer of styrene, characterized by the fact that they contain at least one compound having the structural formula

$$R-C\equiv C-COOH \quad (I)$$

where R is respectively, an alkylic radical containing from 1 to 6 carbon atoms, an arylic radical, an alkylarylic radical a cycloalkylic radical containing from 5 to 7 carbon atoms in the ring a haloalkylic or a haloarylic radical.

2. Composition according to claim 1, where the polyphenylene ether is obtained by oxidative coupling in the presence of a suitable catalyst of one or more alkylphenols, and corresponds to the general formula (II)

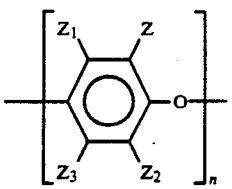

where Z, $Z_1$, $Z_2$, $Z_3$ are independently chosen from the group consisting of hydrogen, chlorine, bromine, fluorine, alkyl, substituted alkyl, cycloalkyl, substituted cycloalkyl, phenyl, and substituted phenyl and n represents the total number of monomeric units and is an integer higher that 50.

3. The polymeric composition of claim 2, wherein said polyphenylene ether is poly(2,6-dimethyl-1,4-phenylene ether), copolymers of poly(2,6-dimethyl-1,4-phenylene ether) or a mixture thereof with one or more alkylphenols corresponding to the general formula (II).

4. The polymeric composition of claim 2, wherein said polyphenylene ether is poly(2,6-dimethyl-1,4-phenylene ether), copolymers obtained from 2,6-dimethylphenol with 2,3,6-trimethylphenol, or mixtures thereof.

5. The polymeric composition of claims 1 or 2, wherein said polyphenylene ether has an intrinsic viscosity within the range of 0.3-0.7 dl/g measured in a solution of chloroform at 25° C.

6. The polymeric composition of claims 1 or 2, wherein said polyphenylene ether contained in the polymeric composition ranges from 1-99% by weight.

7. The polymeric composition of claims 1 or 2, wherein said polyphenylene ether contained in the polymeric composition ranges from 20-80% by weight.

8. The composition according to claims 1 or 2, wherein said (co)polymer of styrene is a polymer, copolymer, interpolymer, random or block, linear or branched or grafted (co)polymer, containing styrenic units.

9. The composition of claim 8, wherein said (co)polymer of styrene is selected from the group consisting of polystyrene homopolymer (PS), high impact polystyrene (HIPS), polystyrene grafted on any polymeric, plastic or thermoplastic substrate, ABS resins, SBR rubbers, linear or star copolymers based on polystyrene or grafted with polystyrene, copolymers of styrene-maleic anhydride styrene-maleic-imide, styrene-acrylic acids, styrene-(meth)-acrylates, acrylonitrile-styrene-acrylates and methacrylate-acrylonitrile-butadiene-styrene.

10. The polymeric composition of claims 1 or 2, wherein the content of the (co)polymer of styrene ranges from 0.95-80% by weight.

11. The composition of claims 1 or 2, wherein said compound having the structural formula (I) is 3-phenylpropiolic acid.

12. The composition according to claims 1 or 2, wherein the compounds having the structural formula (I) are used in a quantity of between 0.05-4 parts by weight for 100 parts by weight of the polyphenylene oxide or, blends of polyphenylene oxide and at least one styrene (co)polymer.

13. A molded product comprising the polymeric composition of claim 1.

* * * * *